(12) United States Patent
Yuasa et al.

(10) Patent No.: US 9,412,394 B1
(45) Date of Patent: Aug. 9, 2016

(54) INTERACTIVE AUDIO COMMUNICATION SYSTEM

(71) Applicant: Jigen-Labs, LLC, Torrance, CA (US)

(72) Inventors: Go Yuasa, Rancho Palos Verdes, CA (US); Tadahiro Suzuki, Carlsbad, CA (US)

(73) Assignee: Jigen Labs, LLC, Torrance, CA (US)

( * ) Notice: Subject to any disclaimer, the term of this patent is extended or adjusted under 35 U.S.C. 154(b) by 0 days.

(21) Appl. No.: 14/642,419

(22) Filed: Mar. 9, 2015

(51) Int. Cl.
| | |
|---|---|
| G10L 21/00 | (2013.01) |
| G10L 25/48 | (2013.01) |
| H04M 1/60 | (2006.01) |
| G06F 9/54 | (2006.01) |
| H04L 29/08 | (2006.01) |
| G06F 3/0484 | (2013.01) |
| G10L 15/22 | (2006.01) |
| G10L 15/18 | (2013.01) |
| G10L 13/033 | (2013.01) |

(52) U.S. Cl.
CPC ............ *G10L 25/48* (2013.01); *G06F 3/04842* (2013.01); *G06F 9/54* (2013.01); *G10L 15/1822* (2013.01); *G10L 15/22* (2013.01); *H04L 67/32* (2013.01); *H04M 1/6083* (2013.01); *G10L 13/033* (2013.01)

(58) Field of Classification Search
CPC ....... G10L 15/22; G10L 13/033; G10L 13/04; G10L 13/08; G10L 15/1822; G10L 15/30; G10L 2015/088; G10L 2015/221; G10L 2015/227; G10L 2015/228
USPC .............. 704/235, 270, 270.1, 275, 260, 251; 379/88.01, 88.08, 88.11
See application file for complete search history.

(56) References Cited

U.S. PATENT DOCUMENTS

| | | | |
|---|---|---|---|
| 6,032,162 A | 2/2000 | Burke et al. | |
| 7,500,193 B2 | 3/2009 | Spielberg et al. | |
| 8,091,028 B2 | 1/2012 | Spielberg et al. | |
| 8,538,372 B2 * | 9/2013 | Yuasa ..................... | H04W 4/22 455/404.1 |
| 8,606,576 B1 * | 12/2013 | Barr ........................ | G10L 15/22 379/88.01 |
| 8,731,942 B2 | 5/2014 | Cheyer et al. | |
| 2008/0250023 A1 | 10/2008 | Baker et al. | |
| 2010/0250248 A1 * | 9/2010 | Willins ............... | G06F 3/04886 704/235 |
| 2011/0055338 A1 | 3/2011 | Loeb et al. | |
| 2011/0099157 A1 * | 4/2011 | LeBeau ............ | H04M 1/72533 707/706 |
| 2012/0022876 A1 * | 1/2012 | LeBeau ................. | G06F 1/3265 704/275 |
| 2012/0245934 A1 * | 9/2012 | Talwar ................... | G10L 15/22 704/235 |
| 2014/0019135 A1 * | 1/2014 | Talwar ................... | G10L 13/08 704/260 |
| 2016/0071509 A1 * | 3/2016 | Zhao ....................... | G10L 13/04 704/260 |

* cited by examiner

*Primary Examiner* — Vijay B Chawan
(74) *Attorney, Agent, or Firm* — Baba Patent Agency (57) ABSTRACT

An interactive audio communication system includes a server for operating the interactive audio communications, a first computing device for operating a first application program, and a second computing device for operating a second application program, wherein the second application program includes the steps of receiving audio inputs from a user via the second microphone, transforming the audio inputs to text strings and transmitting the data of the audio inputs and/or the text strings to the first computing device, wherein the first application program running on the first computing device includes the steps of, receiving the data of the audio inputs and/or the text strings, displaying the text strings together with an audio mark if the text strings are received together with the data of the audio inputs on the first display.

19 Claims, 5 Drawing Sheets

FIG. 9

INTERACTIVE AUDIO COMMUNICATION SYSTEM

FIELD OF THE INVENTION

The present invention relates to an interactive audio communication system, and particularly relates to an interactive audio communication system designed to be operated via a communication network system suitable for vehicle drivers.

BACKGROUND OF THE INVENTION

In recent years, mobile devices (so called "smart phones") having capabilities for sending and receiving voice, text-based messages, images and video have become mainstream personal communication devices. Also, GPS (Global Positioning System) devices have becomes standard devices installed in automotive vehicles.

Particularly, SMS (Short Message Service) and E-Mail have become increasingly important communication media for both the average person as well as business people. Commuting time in the United States of America is 101 minutes per day on average or more than 600 hours per year. In California, for example, a driver of a motor vehicle is prohibited from using a wireless telephone unless that telephone is designed and configured to allow hands-free listening and talking.

Accordingly, there is a great need for interactive audio communication systems for providing solutions for reading and responding to messages and emails in a vehicle without using the eyes and hands, so that the driving time of vehicle can be effectively and/or enjoyably used by anyone.

SUMMARY OF THE INVENTION

An object of the present invention is to overcome the above drawbacks. The system structure of the present invention will be realized by a system for operating interactive audio communications using a communication network, including:
at least one server for providing an application programming interface (API) for operating the interactive audio communications on the communication network, said at least one server being connected to the communication network;
a first computing device for operating a first application program using the API via the communication network, the first computing device including:
  a first processor;
  a first memory;
  a first speaker; and
  a first display;
a second computing device for operating a second application program using the API via the communication network, the second computing device including:
  a second processor;
  a second memory;
  a second microphone;
  a second speaker; and
  a second display for displaying information transmitted from the first computing device via the communication network using the second application program using the API via the communication network;
wherein the second memory stores instructions in the second application program that, when executed by the second processor, causes the second processor to perform a second operation including the steps of:
  starting the second application program using the API via the communication network;
  downloading the information from the first computing device via the server;
  displaying the downloaded information on the second display;
  receiving audio inputs from a user of the second computing device via the second microphone;
  memorizing data of the audio inputs into the second memory;
  transforming the audio inputs to text strings; and
  transmitting the data of the audio inputs in the second memory and/or the text strings to the first computing device;
wherein the first memory stores instructions in the first application program that, when executed by the first processor, causes the first processor to perform a first operation including the steps of:
  receiving the data of the audio inputs and/or the text strings;
  displaying the text strings together with an audio mark which shows that the data of the audio inputs are received together with the text strings if the text strings are received together with the data of the audio inputs on the first display; and
  reproducing the audio inputs via the first speaker if a user of the first computing device touches the audio mark on the first display.

According to an embodiment of the present invention described above, the audio inputs are transformed into text strings and the text strings are transmitted to the other party together with the data of the original audio inputs. The audio mark is displayed together with the transmitted text strings on the screen when the original audio inputs are received by other party. Thus, it is possible to reproduce original audio inputs by touching the audio mark when the audio inputs are transformed into strange words and it is difficult to understand the correct meaning of the message. Particularly, when a proper noun in a foreign language is used in the audio inputs, sometimes it is difficult to transform it into the correct English word. In such case, this feature can be used to listen to the original audio inputs being sent together with the transformed text string instead of trying to decipher the strange word.

Another object of the present invention is to overcome the above drawbacks. The system structure of the present invention will be realized by a system for operating interactive audio communications using a communications network, including:
at least one server for providing an application programming interface (API) for operating the interactive audio communications on the communication network, said at least one server being connected to the communication network;
a first computing device for operating web-site programs using the API, the first computing device being arranged to communicate with said at least one server via the communication network, the first computing device including:
  a first processor;
  a first memory; and
  a first display;
a second computing device for operating application programs using the API via the communication network, the second computing device including:
  a second processor;
  a second memory;
  a second display; and
  a second microphone
wherein the second memory stores instructions in the application programs that, when executed by the second processor, causes the second processor to perform a second operation including the steps of:

receiving an inquiry in audio form via the second microphone or an inquiry in text form from a user of the second computing device;

transforming the inquiry in the audio form into text strings: and transmitting data of the inquiry in the audio form and the text strings or data of the inquiry in the text form, geographical information of the user and time information showing a location and a time where and when the transmission to the first computing device is performed;

wherein the first memory stores instructions in the web-site programs that, when executed by the first processor, causes the first processor to perform a first operation including the steps of:

receiving the data of the inquiry in the audio form and the text strings or the data of the inquiry in the text form, the geographical information and the time information from the second computing device via the communication network;

extracting at least a keyword from the text string and associating said at least a keyword with advertisements to be broadcast;

displaying an audio mark for reproducing the inquiry in the audio form together with the text strings with said at least a key word on the first display if the inquiry in the audio form is received;

displaying a time table including the advertisements including said at least a keyword on the first display;

displaying a map associated with the geographical location of the user on the first display; and.

transmitting answers or responses in a text form to the inquiry.

According to an embodiment of the present invention described above, an operator of the first computing device for operating website receives the inquiry in the audio form and the text strings transformed from the inquiry in the audio form. Then the operator can listen to the inquiry in the audio form. At the same time, the first display of the first computing device displays the text strings of the inquiry or the inquiry in the text form transmitted from the second computing device, map associated with the location where the inquiry was placed and a time table including advertisement related to the inquiry using keywords extracted from the inquiry. Then the operator provides the answers to the inquiry. Since the advertisement being related to the inquiry can be provided, it is possible to deliver advertisements effectively and timely aimed at target customers. Also, it becomes possible to change time table of advertisement by using extracted keywords. Namely, when the extracted keyword is included in the advertisement scheduled to air at a later time, it is possible to change the schedule to timely deliver the advertisement.

Another object of the present invention is to overcome the above drawbacks. A system structure of the present invention will be realized by a system for operating interactive audio communications using a communication network, including:

at least one server for providing an application programming interface (API) for operating the interactive audio communications on the communication network, said at least one server being connected to the communication network:

a first computing device for operating a first application program using the API via the communication network, the first computing device including:

a first display;
a first processor; and
a first memory, a second computing device for operating a second application program using the API via the communication network, the second computing device including:

a second processor,
a second memory;
a second microphone; and
a second speaker wherein the first memory stores instructions in the first application program that, when executed by the first processor, causes the first processor to perform a first operation including the steps of:

starting the first application program to display information provided by said at least one server;

selecting items from the information provided by said at least one server and/or creating to-do items;

transmitting the selected items and/or the to-do items to the second computing device via the communication network;

wherein the second memory stores instructions in the second application program that, when executed by the second processor, causes the second processor to perform second operation including the steps of:

receiving the selected items and/or the to-do items transmitted from the first computing device using the second application program via the communication network;

performing a function related to the selected items and/or the to-do items;

receiving audio inputs from a user of the second computing device via the second microphone;

transforming the audio inputs to text strings; and transmitting data of the audio inputs and/or the text strings to the first computing device.

According to an embodiment of the present invention described above, the selected items and/or the to-do items are transmitted from the first computing device to the second computing device located in the vehicle, for example. Further, the second computing device performs a function related to the selected items and/or to-do items; for example, performing a function for reading out loud the messages selected in the vehicle and responding to messages by inputting audio inputs. The audio input is transformed into a text string and the transformed text string is transmitted to the other party together with the data of original audio inputs. By using this feature, the driver can work on the selected items and/or the to-do items in the vehicle without using the hands and eyes. As a result, the driver can efficiently use driving time without using the hands and eyes. It is also possible to reproduce original audio inputs when the audio inputs are transformed into strange words and are therefore difficult to understand. Particularly, when a proper noun in a foreign language, for example, is used in the audio inputs, sometimes it is difficult to transform it into the correct English word.

DETAILED DESCRIPTION OF THE INVENTION

In this specification, when a single device or article is described, it will be readily apparent that more than one device/article may be used in place of a single device/article. Similarly, where more than one device or article is described, it will be readily apparent that a single device/article may be used in place of the more than one or article.

The functionality and/or features of a device may be alternatively embodied by one or more other devices that are not explicitly described as having such functionality/features.

In all of the disclosed embodiments, any element used in an embodiment can be replaced with any elements equivalent thereto, including those explicitly, necessarily, or inherently disclosed herein, for the intended purposes. Further, the present invention can equally be applied to apparatuses and methods.

Figure 1:
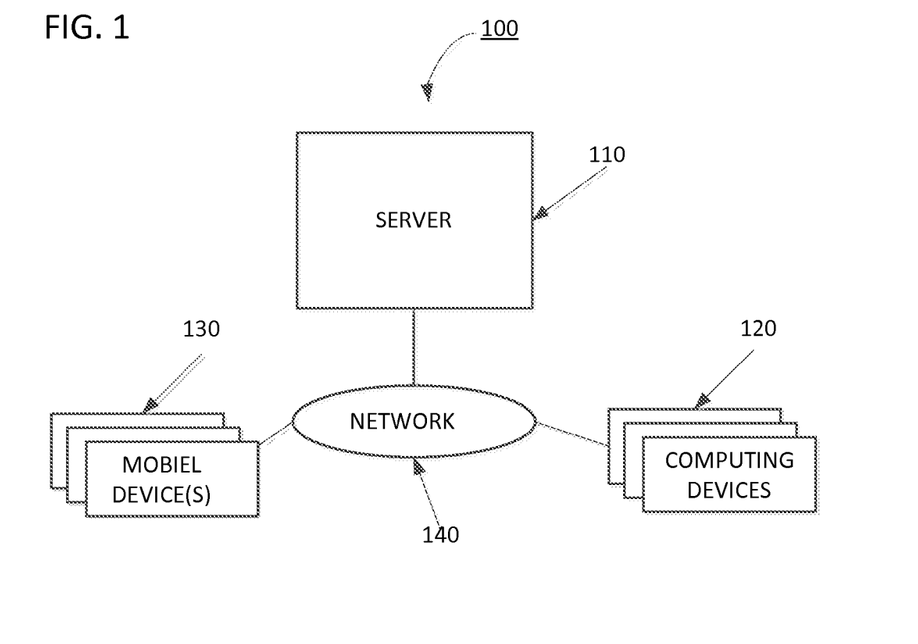
FIG. 1 illustrates a block diagram depicting an architecture for implementing an interactive audio communication system according to an embodiment of the present invention.

Referring now to FIG. 1, there is provided a block diagram depicting an architecture for implementing an interactive audio communication system 100 according to an embodiment of the present invention. The interactive audio communication system 100 is configured by a sever 110, computing devices 120 which include workstation-class processing machine, desktop computers, laptop computers and tablet computers, and a mobile device 130, such as a mobile phone having capabilities of data communications and voice communications. The server 110, the computing devices 120 and mobile devices 130 are arranged to communicate with each other via a communication network 140 including internet. The server 110 can be not only a one server but also multiple servers connected to the communication network 140.

According to an embodiment of the present invention, a website service implemented by server 110 is designed to provide services suitable for persons driving vehicles. The website services described here include three types of services a) messaging services performed among multiple computing devices 120, mobile devices 130 and combinations thereof, b) searching services for answering questions from users of computing devices 120 or mobile devices 130 and c) car-queue services for organizing things to do in a vehicle. The website services described here are designed to be particularly useful for a driver of a vehicle when driving but are not limited to such activity. The website services described here can be used in communications between computing devices, mobile devices and combinations thereof.

As described above, there is a demand for interactive audio communication systems that provide solutions for reading and responding to messages and emails in a vehicle without using the eyes and hands. In order to realize the interactive audio communication system suitable for communications between a mobile device 130 in a vehicle and a computing device 120 outside the vehicle, the communication needs to be performed without the user needing to read characters on a display screen of the mobile device 130 in the vehicle and without the user needing to use the hands to respond to incoming messages while driving. To realize this hands-free and eyes-free operation, inventor thinks that an interactive audio communication system that can be used without reading and inputting characters is one of the solutions to the problems. In other words, if the mobile device 130 in the vehicle receives a message in a text form, the text-based message is converted into an audio form, and when responding to the message, an audio input message is converted into text form to transmit the response from the mobile device 130 to the other party.

Figure 2:
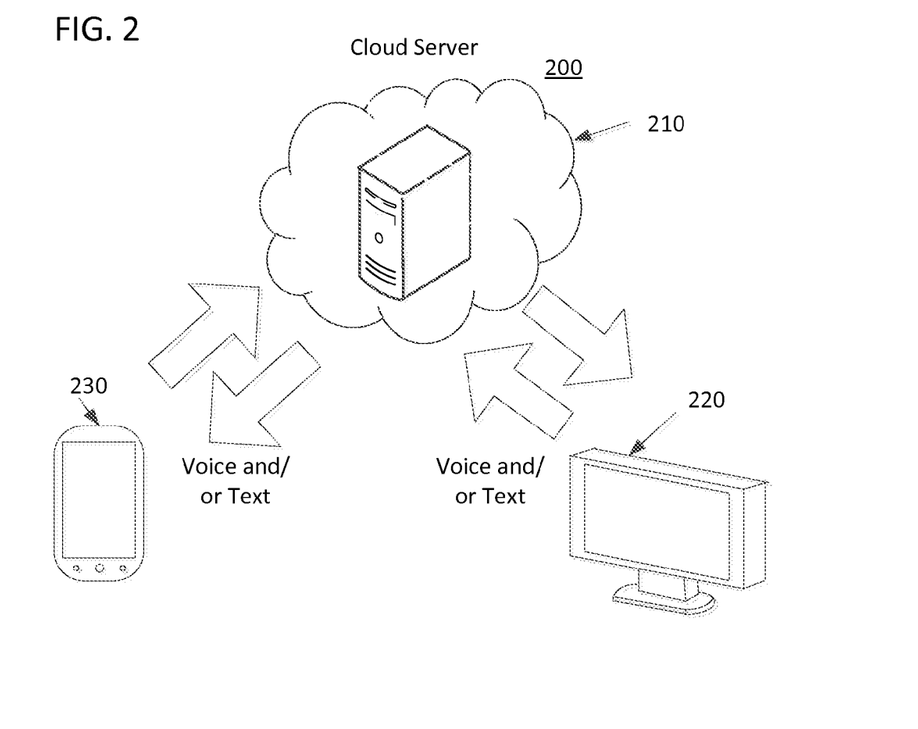
FIG. 2 illustrates an example of the interactive audio communication system including a mobile device, a computing device and a server in terms of data forms exchanged between them.

FIG. 2 illustrates an example of an interactive audio communication system 200 including a mobile device 230 and a computing device 220 outside the vehicle, both of which are arranged to communicate with each other through a server 200 operating interactive audio services via a communication network, such as the Internet. In this example, the server 210 provides a website service including messaging service, searching service or car-queue services, or a combination thereof. Those services described above are associated with email services, updated news delivery services, a to-do list, SMS (Short Message Service) for sending and receiving text based messages between a mobile device 130 in the vehicle and other communication devices outside the vehicle. In order to utilize the website service, the user is required to resister his/her name, a password, email address, and location, including the country where the user resides. According to an embodiment of the present invention, the user may start an application program using an application programming interface (API) of the service provided by the server 210. Details will be described later using examples.

As illustrated in FIG. 2, when a driver of a vehicle tries to send messages from his or her mobile device 230 to a person outside the vehicle, for example, speech inputs (audio inputs signals) of the driver inputted via a microphone of the mobile device 230, and the inputted audio signals are converted to text strings using STT (Speech To Text) function implemented in the mobile device 230. On the other hand, text-based messages received by the mobile device 230 in the vehicle transmitted from the devices outside the vehicle need to be converted into audio signals using the TTS (Text To Speech) function of the mobile device 230. Then the received text-based messages will be read aloud via the speaker of the mobile device 230. The mobile device 230 has capabilities of TTS (Text to Sound conversion) and STT (Sound To Text conversion) as a function of the mobile device, such as a smartphone. In this embodiment, TTS and STT functions equipped with the mobile device 230 are used to convert text strings into audio siganls and vice versa. TTS and STT are also perfomed in the computing device 230 and server 210 as well.

Example 1

Messaging Service

Figure 3:
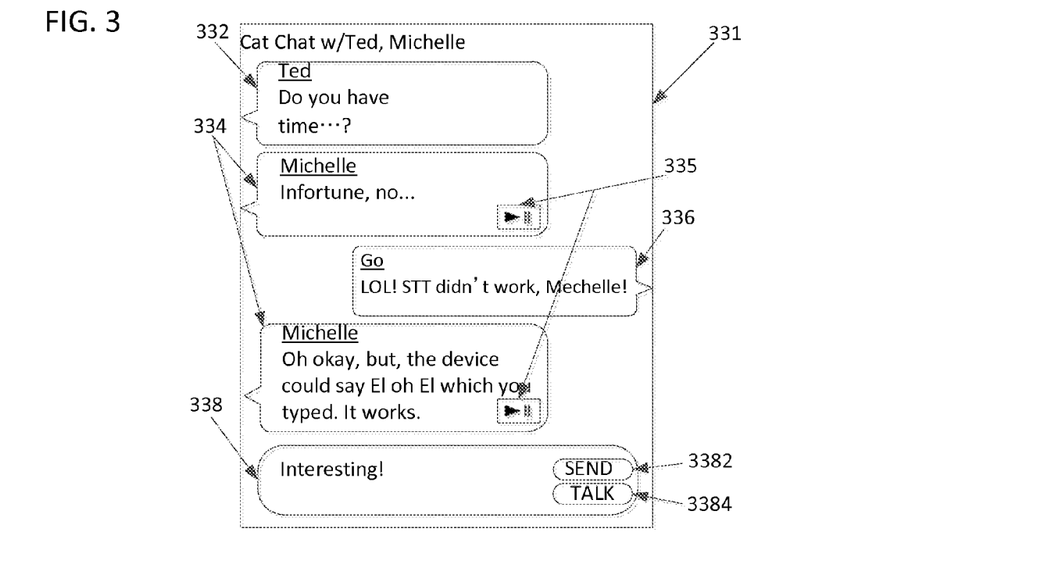
FIG. 3 illustrates an example of a screen of a mobile device when used in communications between three persons according to an embodiment of the present invention.

Referring to FIG. 3, there is provided an example of a screen of a mobile device 130 (referring to FIG. 1) when used in the messaging service provided by the server 110 of an embodiment of the present invention. In order to use the messaging service, each user needs to register his or her name, email address, gender, password, telephone number, birthday, and address, including the country where he or she lives, to the server in advance. When logging into the server 110, at least ID (Identifications) and his or her password are necessary. This example shows a screen of an application program running on a processor of the mobile device 110 after the login process has been completed. The application program is designed to perform interactive audio communications, which allows a plurality of persons to communicate with each other using the messaging service performed by the server 110.

In this example, three users, Ted, Michelle and Go are enjoying a chat session using the messaging service performed by the server 110. Each user is allowed to input his or her messages in an audio form via a microphone or in a text form via an input device such as a mobile device or a computing device used in the chat. A message in audio form is converted into text strings by the STT (Speech To Text) function of the mobile device 130 or the computing device 120 and the original audio messages and the text strings are transmitted to other parties via the server 110. Each message, including the audio form and text string, is arranged to be stored in the server for a predetermined time period.

When the message is received by the other parties, each device is arranged to display an audio mark 335 for reproducing the original audio input together with the text strings in a message box 334 The audio mark 335 is designed to reproduce an audio file including original audio input signals received by the mobile device 130 or the computing device 120. In this example, text messages transmitted from Michelle are shown in a message box 335. In the message box 334, "infortune" and "EL oh EL" seem to have been converted into strange text strings, and sent to Ted and Go's devices via a server 110 for providing the message service. The converted text strings "Infortune, on . . . " and "EL oh EL" are transmitted with its audio files including original audio inputs from Michelle.

As shown in this EXAMPLE 1, still there are some possibilities when the audio inputs are not correctly converted into the correct text strings due to technical limitations of STT (Speech to text) technologies currently available. In these cases, the audio mark 335 can be used to reproduce original audio inputs, by touching the audio mark 335 so that a receiving user can understand the correct meaning of the messages. The audio mark 335 does not appear in a message box 332, which indicates that no audio file of the message is attached to the message.

In this example illustrated in FIG. 3, message box 338 indicates a message to be sent from Go's device. The inputted text string "Interesting!" can be converted into an audio form at the devices of the receiving parties, so that if, for example, Ted or Michelle is driving a vehicle, the text message is read out loud via a speaker in the vehicle In this embodiment, the user can setup the device to hear the messages in audio form when text-based messages are received. Then the device automatically reads out loud the text messages without the need to touch audio mark 335. Thus, the user can receive and understand the text-based messages without reading the messages.

This example shows a messaging service of a chat session held among multiple people. However, the notation of the audio mark as described above can be applied not only to messaging services but also, email services, news delivery services and the like, which include text-based information so that the information is read out loud to realize eyes-free and hands-free operation when receiving such information.

In the message box 338 in FIG. 3, a SEND button for sending a message and a TALK button 3382 for recording a message into the memory of the device are displayed. The SEND button 3382 is designed to send messages by touching the SEND button 3382 after typing or recording messages to be sent to the other party. Talk button 3384 is designed to record audio input messages into the memory of the device used by the user. When touching the TALK button 3384 for less than a certain amount of time, for example 0.3 seconds, audio input messages are recorded into the memory for a predetermined amount of time, for example 10 seconds or until the audio input message ends. The TALK button can also be designed to start recording the audio input messages from the user into the memory and to stop recording when the TALK button is next touched. Those functions of the TALK button are designed in application programs running on the processor of the device used with messaging services.

The TALK button can also be designed in the application programs running on the processor of the device to record audio input messages from the user of the device together with location information including latitude and longitude where the device is located by touching the TALK button for a time period not less than 0.3 seconds and not more than 3.0 seconds. The user preferences regarding whether location data is transmitted together with the input message can be selected by the user. The location information can be linked to map database so that other useful applications can be performed. This will be described later.

Another embodiment of the present invention is to send a predetermined voice message instead of an own voice message. The predetermined voice message is a prerecorded short audio message, such as "Yeah", "No-!", "I'll be back" or "You don't know the power of the dark side" which may have been made popular in a movie and spoken by a famous actor, actress or character, instead of in one's own voice. Those predetermined voice messages are designed to be downloaded from the server 110 to the mobile device 130 or the computing devices 120 free of charge or for some fee. These predetermined voice messages can be presented and sent out instead of one's own voice when responding to incoming messages. This is a useful function when the user wishes to be entertaining, or remain anonymous. Another embodiment associated with the messaging service is a voice filter for changing the frequency characteristic of the audio input from the user of the device. The user can use this filter by selecting one of the filters presented on the screen of the device so that the original voice can be changed to another voice having a different frequency characteristic when sending voice messages.

Example 2

Search Service

Example 2 describes an interactive audio communication system for providing a search service for users having a mobile device 130 or a smartphone in a vehicle or for a user having a smartphone outside the vehicle. In EXAMPLE 2, the user is required to register his or her name and a password to open his or her account in advance on a website for operating the search service, in the same way as described in EXAMPLE 1. In EXAMPLE 2, the search service is provided by one of the clients of the server 110 or by a server 110 as a part of the function thereof. In order to register as an operator of the search service with the server 110, at least a name, a password, and a country code where the search service is operated, need to be registered to the server 110 in advance.

The server 110 receives inquiries from a user using the computing device 120 or the mobile device 130. The website for operating the search service can be provided by one of the computing devices 120 connected to the server 110 via the communication network 140 as described above.

Figure 4:
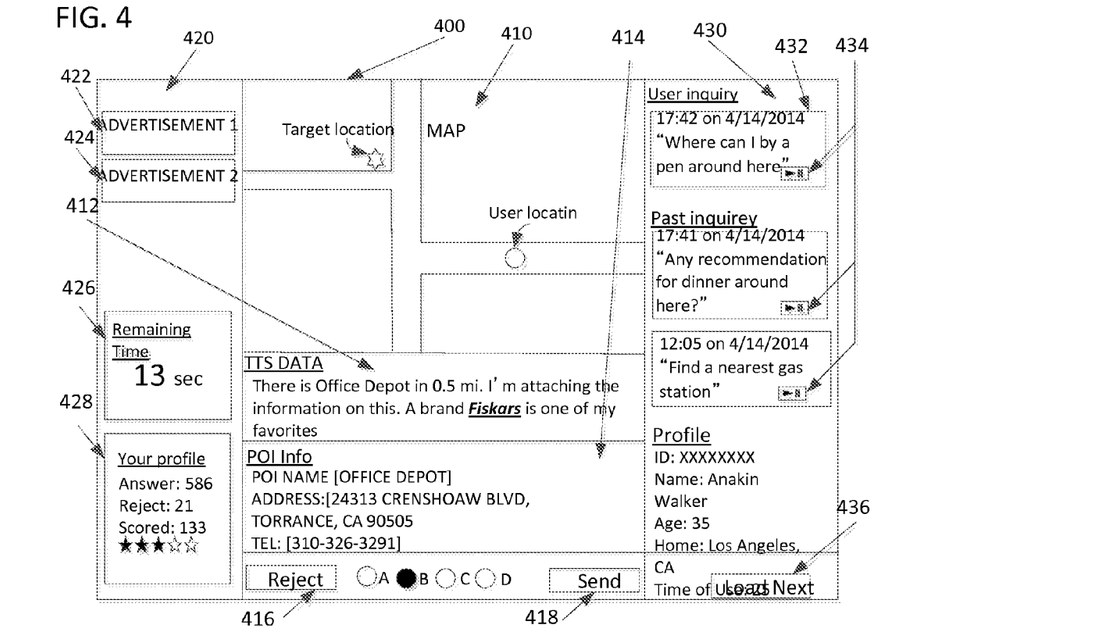
FIG. 4 illustrates an example of a screen of a console used in a portal site operated on a computing device in the interactive audio communication systems.

FIG. 4 illustrates an example of a screen of a console used in the website operated on a computing device 120 using the interactive audio communication system. When an operator of the search service logs-in to start operation of the search service, the operator needs to log-in and touch the LOAD NEXT button 436 on a screen of the search console to download a queue of inquiries from users which have been stored in the server 110.

In order to use the search service of an embodiment of the present invention, the user needs to send his or her ID (Identification) and password to log-in to his or her account, and then send an inquiry or request in an audio form and/or text form, his or her positioning information including latitude and longitude, the direction in which the user is moving and various information based on the user's account permissions that the user wants to give an operator of the search service. As for the location information, a user can use the GPS data of the vehicle. As for the direction, it is calculated by using the location information several seconds ago and current location information. The user can use a mobile device to send an inquiry to the operator of the search service. The user can also use a mobile device in a vehicle or a computing device outside the vehicle to send an inquiry to the operator of the search service.

For example, when looking for an Italian restaurant for a lunch, a user in a vehicle sends an inquiry such as "is there any good Italian restaurant for lunch?" to the operator of the search service by inputting the inquiry in an audio form to the mobile device 130. Here, the user inputs the inquiry in an audio form via the microphone or in a text form by inputting the inquiry using the keyboard of the device. When the inquiry in an audio form is converted into text strings, the inquiry in the audio form and text strings or the inquiry in the text form are transmitted to the server 110. Then the server 110 saves the inquiry and transmits the inquiry to an operator who has made an inquiry download request. Then the operator of the search service listens to the inquiry in the audio form. In response to the received inquiry, the operator conducts a search or an action to provide answers or a response to the inquiry from the user by using relevant data sources or other functionality. A guideline for the operator for providing answers to an inquiry sets that an operator should answer an inquiry within two minutes in this example, but is not limited to two minutes. In almost all cases, it may be answered in up to five minutes.

Referring to FIG. 4, there is provided an example of a console screen 400 of a computing device 120 used for providing the search service (it is referred to as a "portal site" hereinafter). The console screen 400 is designed to be used by the operator who plays a role for receiving inquires from users or participants (for example, a user of mobile devices 130 in FIG. 1) and providing the answers or responses to the inquiries. In this embodiment, the operator of the portal site downloads inquiries from the server 110 by touching the LOAD NEXT button 436 as described previously.

Here, not only one portal site for operating the search service but also multiple portal sites can be operated simultaneously. The console screen 400 includes a user inquiry area 430 for displaying the user inquiry and associated information, such as the name, age and address. The console screen 400 includes a map area 410 for displaying a map which is related to the location information of the user who places the inquiry to the search service and an advertisement area 420 for display advertisement information to be sent to users together with the answers. When the user sends the inquiry in an audio form, the audio mark 434 is displayed adjacent to the text string. Then, the operator can listen to the inquiry in the audio form.

When sending the inquiry from the user, operating system information of the computing device of the user is transmitted together with the inquiry so that the operator can identify the computing device used by the user. In other words, the operator can identify what kind of computing device is being used based on the operating system information. Then, the type of computing device, for example, a mark showing a smartphone or a tablet may be displayed in the user inquiry area 430.

As shown in FIG. 4, there is provided a remaining time area 426 for showing the remaining time to answer the inquiry in the left side of the console screen 400 in this embodiment. The color of characters showing the remaining time is arranged to change from the first color, for example, black, to the second color, for example, red, when the remaining time is up. In another embodiment, the color of the characters showing the remaining time is arranged to change from the first color to the second color prior to the end of the remaining time so that the operator knows he or she should answer the question within the time limit. The countdown of the remaining time starts when the inquiry is received at the server 110. In another embodiment, the countdown to the end of the remaining time starts when the inquiry is received by an operator of the portal site. The user of the search service can rate the operator's performance based on the satisfaction level of the user. The rating factor 428 of the operator shows the average rating level calculated using past rating factors of the operator. The rating factor 428 is displayed adjacent to the remaining time area 426 in this embodiment so that the operator is motivated to provide better answers to the user who rates the performance of the operator.

The answer to the inquiry is typed by the operator in a short sentence and text based answers 412 are transmitted by touching the SEND button 418 from the portal site providing the search services after conducting the necessary search operations. Then, the mobile device 130 of the user receives the text based answers 412 and converts them into audio form by applying TTS so that the answer can be read out loud in the vehicle. When the inquiry cannot be answered or the inquiry is out of the scope of the service as specified by the service's rules, the operator can use the REJECT button to respond the inquiry from the user using a template message. The operator may also input the answers or responses to the inquiry in the audio form instead of typing the answers or response using keyboard.

It is also possible to convert the inputted answers in a text form into an audio form using the TTS function of the portal site. When transforming the text string into audio form in the background to see if the answer in the text form is correctly transformed at the device of the user and when there is a word which is not found in the TTS dictionary, the word is marked with a visible sign on the display. Then this information is transmitted to the server 110 and saved in the database in the server 110 so that this word can be used to improve the capability of the TTS dictionary.

In this example, as described above, the location information including the direction in which the user is moving is transmitted from the user. The map displayed on the map area 410 is the map which is selected using the location information received with the inquiry from the user. The search operation process running on the computing device operating the portal site is arranged to pick up keywords and location information from the inquiry and selects POIs (Point of Interest) based on the picked-up keywords. The selected POIs are displayed on the map area 410. For example, when the inquiry from the user includes keywords related to "restaurants for lunch", then several lunch restaurants are picked, as displayed. The restaurants in the area where the user is heading to can be selected according to the location and the direction information.

In this embodiment, as illustrated in FIG. 4, POI information which includes the name of the POI, address and telephone number are displayed. The telephone number is a link to the telephone application program so that the user can call the POI using the mobile device 130 without inputting the telephone number when the answers are transmitted to the mobile device 130.

It is also possible to select the map using keywords used in the inquiry from the user. For example, when address information, including street name, city name, or zip code, the portal site (web-site) programs running on the computer device 120 operating the portal site and or server 110 can pick up the map information from such keywords in the inquiry.

An audio mark 434 is displayed adjacent to the inquiry in the inquiry area 432. In this example, the user inputted his/her inquiry in an audio form. The inquiry in the audio form is transformed into text strings using STT function in the mobile device 130 and transmitted to the computing device 120 operating the search services. Then, the operator of the search service can hear the inquiry in the audio form and the inquiry including the text strings is displayed on the inquiry area 432 together with, the audio mark 434.

In this example, the current inquiry is displayed in the inquiry area 432 and previous inquiries from the same user are displayed below the current inquiry. Also, the profile of the user who placed the inquiry is displayed in the lower portion of the user inquiry area 430.

In this example, two advertisements 1 and 2, 422 and 424 are scheduled to be sent out as illustrated in FIG. 4. However the number of advertisements is not limited to two. It may be none or more advertisements. In this example, advertisement 1 is scheduled to be broadcast earlier than advertisement 2. However, earlier advertisements can be displayed below the later scheduled advertisement. The advertisement is transmitted together with the answer to the inquiry to the user who is using the search service provided by the computing device 120 or the server 110. It may be possible to answer the inquiry without advertisement if the user has a membership (pays a membership fee) of the search service or under other circumstances.

Further, the web-site programs running on the computing device 120 for operating the search service are designed to select a suitable advertisement which seems to satisfy the needs of the user by correlating the contents of the advertisement and the extracted keywords picked up from the inquiry from the user. Then the web-site programs running on the computing device 120 for operating the search services determines to see if there are any correlations between the picked-up keywords in the inquiry and the contents of any scheduled advertisements. If there are any such keyword correlations, the advertisement schedule can be changed to give priority to the appropriate advertisement so that effective advertisement targeting for the user can be realized.

For example, when the contents of an inquiry relate to the topic of "an Italian restaurant for lunch" and the advertisement 2 is related to the advertisement of Italian restaurant, the web-site programs running on the search service determine that advertisement 2 is transmitted together with the answer to the inquiry instead of transmitting advertisement 1. The operator of the search service also may change the time table of the advertisement so that advertisement 1 is replaced by advertisement 2. In this instance, the location of the user and the Italian restaurant that provides the advertisement may be displayed on the map area 410 on the browser screen 400.

Figure 5:
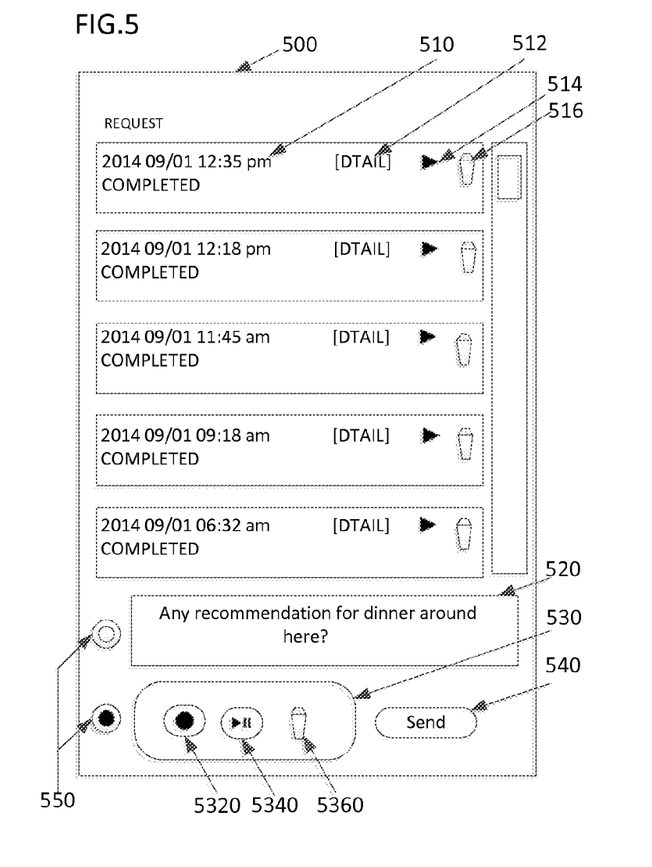
FIG. 5 illustrates an example of a screen of a mobile device used for making inquiries in the interactive audio communication system of an embodiment of the present invention.

FIG. 5 illustrates an example of a screen 500 showing a screen of the mobile device 130 of the user who uses the search service operated by the portal site. When sending an inquiry, the user touches the TALK button 5320 to start recording the inquiry in the audio form. Then an STT (Speech to Text) function works to convert the inquiry in the audio form (audio input signals) from the user inputted via a microphone of the mobile device 130 into text strings and the text strings are displayed on an inquiry screen 520. PLAYBACK button 5340 is used to playback the recorded inquiry in the audio form before sending the inquiry if the inquirer wants to review the contents of the inquiry. When the SEND button 5320 in touched, the inquiry is sent to the portal site for operating the search service via the server.

In the example, the audio input is converted into text strings using the STT function of the mobile device. However, the user outside the vehicle may prefer to send an inquiry by inputting text via a keyboard on the screen. In this case, an inquiry in text form can be sent to the website for operating the search service. The user can select the input method of the audio input or text input by touching a select buttons 550.

Figure 6:
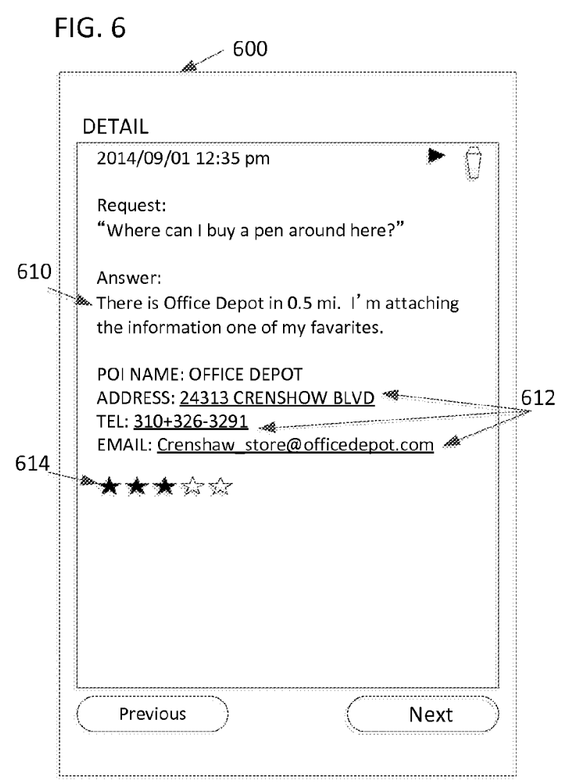
FIG. 6 illustrates an example of a screen showing details of the inquiry and its answers when the DETAIL button in FIG. 6 is touched by the user.

On the screen 500, inquiry logs including time and date 510 when the inquiry was sent are displayed together with the DETAIL button for showing the contents of the inquiry and answers thereof and a TRASH CAN mark for deleting the log. FIG. 6 shows one of the example screens when the DETAIL button is touched. As illustrated in FIG. 6, contents of the inquiry or request and the answers or responses for the inquiry 610 and POI data are displayed. In this example, the address information, contact information, such as telephone numbers and email information 612 are linked respectively to the map, telephone and email functions of the mobile device 130. Further, a rating factor 614 for the operator providing the answers is displayed. When touching the NEXT button, the detail data of the next log can be displayed. When touching the PREVIOUS button, the detail data of previous log can be displayed.

Back to FIG. 5, the user of the mobile device 130 inputs the inquiry in the audio form via the microphone of the mobile device 130 to record the inquiry in the audio form in the memory of the mobile device 130 by using the TALK button 5320 on the screen. When the TALK button 5320 is touched, the color of the center portion of the TALK button changes to red, for example, to show that the audio inputs are being recorded. PLAY button 5340 for playing back the recorded audio inputs and DELETE button 5360 for deleting the recorded audio inputs are also displayed in the inquiry area 530. The STT (Speech to Text) function of the mobile device 130 converts the audio form into text strings. Then, the inquiry including the text form and audio form is transmitted to the computing device 130 for providing the search service when the user touches the SEND button 540. The inquiry is saved by the server 110 in this embodiment. As described above, the user can input a text inquiry instead of an inquiry in the audio form. In this case, when this inquiry is received by the portal site performing the search service, no audio mark is displayed on the console screen of the portal site for performing the search service.

The same system configurations used in the search service described in EXAMPLE 2 can be used in a following embodiment of a call center application. Call centers or technical support centers of the products or services receive questions and inquiries from users associated with such products or services. However, in general, it takes time to reach a representative to obtain the answers to questions. Also, initial automated announcements of call centers ask users to use a website or email to send questions.

By using the same infrastructure described in EXAMPLE 2, the user sends questions or inquiries in an audio form from the computing devices, such as mobile devices 130 or computing devices 120. Then the mobile device, for example, converts the audio inputs from the user to text strings and sends the question including an audio form and text string to the call or technical support center (which includes a portal site for operators answering questions regarding the product, for example). Then, the operator of the portal site for answering questions answers the questions in audio form or in text form (typing) and the answers are transmitted to the mobile device of the user. The mobile device of the end user converts the answer in the text form into audio form so that the user can obtain the answers to the questions without frustration. In other words, a system including questions in voice messages and answers in text stings or in an audio form can be realized, which eliminates many current problems associated with the operation of call centers for answering questions from the customers. Since the user can make questions in an audio form and obtain the answers in a text form or an audio from, this system can be easily operated by users who are not familiar with or do not want to do any typing.

Example 3

Car-Queue Service

Next, a car-queue service performed by the server 110 which is an embodiment of the present invention will be described using FIG. 7. The car-queue service performed by the server 110 includes functions for organizing items to-do in a vehicle while driving, such as, "call the business colleagues", "send SMS to a secretary for meetings scheduled" "read unread messages" and "prepare brain storming ideas". In order to use this service, the user needs to log-in to the car-queue service provided by the server 110 by inputting his or her ID (Identification) and password in the same way as other services.

In this example, a user creates items to-do in the vehicle using a car-queue application program running on a computing device, such as a smartphone or a personal computer before leaving home and getting them in the car, either by text input or speech input via a microphone attached to the computing device. Then the car-queue application program transmits the to-do items to the server 110 from the computing device. When the user starts the car-queue application running on an infotainment system in the vehicle, the to-do items are displayed on the screen of the infotaiment system.

Figure 7:
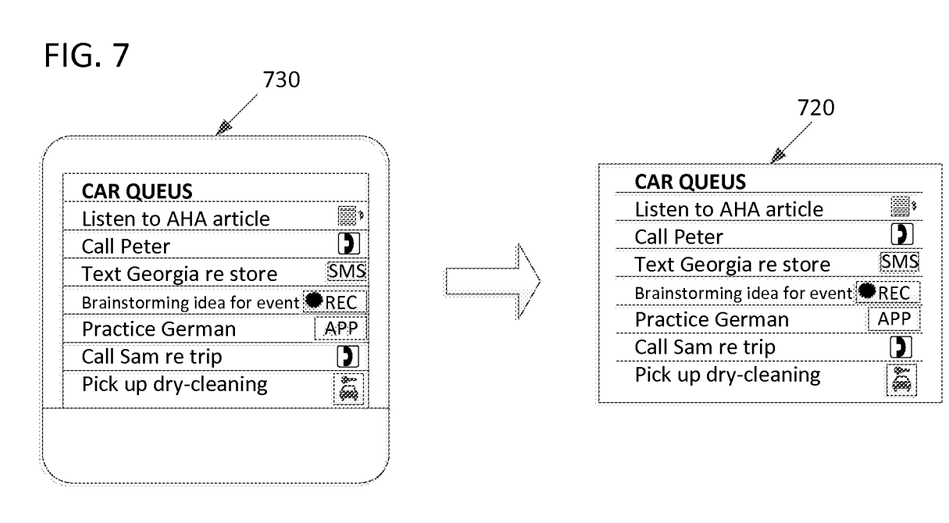
FIG. 7 illustrates an example of screens of two computing devices between which information is transmitted from one computing device to another in the interactive audio communication system of an embodiment of the present invention.

FIG. 7 illustrates a screen of a smartphone 730 outside the vehicle and a screen of an infotainment system 720 equipped with a vehicle. In this example, the user of the smartphone 730 inputs things to-do to be done in the vehicle, for example, "listen to AHA article", "call Peter" and "Text Geogia re store", for example. The application program for the car-queue service running on the smartphone at outsite the vehicle allows the user to input the to-do items in the vehicle by typing the text inputs, or by inputting them in an audio form via a microphone of the smartphone 730.

These to-do items are inputted via text input from a keyboard or speech inputs (audio input signals) from a microphone of the smartphone 730. When the speech input is performed, STT (Speech To Text) functions are applied to the speech inputs to convert the audio signals to text strings. Then the text string and original audio input signals are transmitted to the infotainment system in the vehicle via the server 110. In this instance, the text string and the audio signals are stored in the server 110 for a predetermined time period.

When, the user selects "call Peter", for example, the infotainment system calls Peter by picking up Peter's phone number and automatically calling Peter without any need to input the number, allowing the user to talk with Peter in the vehicle. Then, the user selects "text Geogia re store". The user inputs his or her message by speaking the message to the microphone of the infotainment system. Then the STT function equipped in the infotainment system converts the speech inputs (audio input signals) into text strings. The text string and/or original audio message are transmitted to Geogia through server 110. When receiving a response in a text form from Geogia, the text messages is read out loud by using the TTS function of the infotainment system.

The speech inputs of the user are recorded in the memory of the infotainment system equipped in the vehicle. For example, when the user selects "Brainstorming idea for event" in the vehicle and starts speaking his or her ideas to the microphone of the infortaiment system of the vehicle, the audio inputs from the microphone can be recorded in the memory of the infortaiment system. Then all data is transmitted to the server 110 and stored in the memory of the server.

When having arrived at the office, the user wants to continue working on "Brainstorming idea for event", the user starts the car-queue application program on the computer at the office. Then the user logs-in to the service to work on "Brainstorming idea for event". These examples described above are a part of the car-queue service implemented by the server 110.

Human Interface Device

Figure 8:
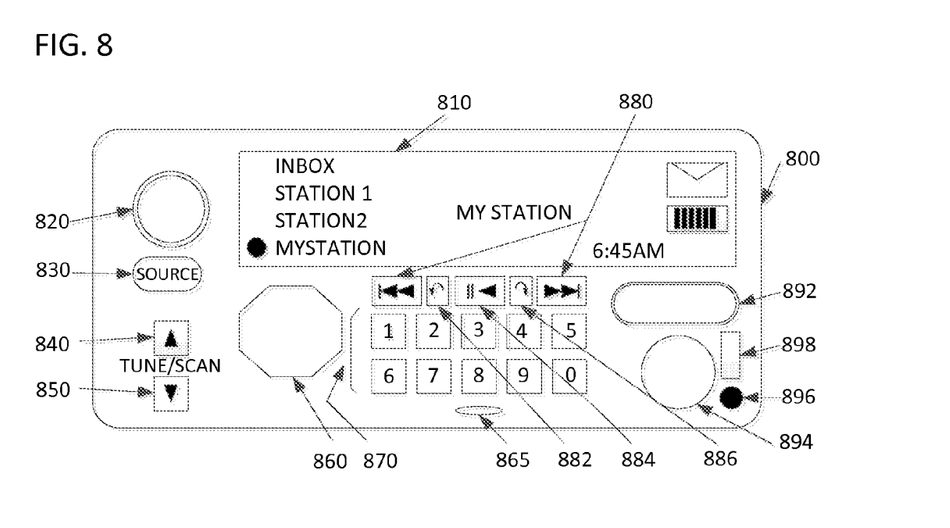
FIG. 8 illustrates an example of front panel key layout of a human interface device according to an embodiment of the present invention.

FIG. 8 illustrates one example of front panel design of a human interface device 800 specially designed for communicating with a mobile device 130 to use the car-queue service, messaging service and search service safely in the vehicle. The human interface device 800 and the mobile device, such as a smartphone, are arranged to communicate with each other via a wireless communication system, such as Bluetooth or WiFi or the like. The human interface device 800 is arranged to be attached to a sunvisor of a vehicle and operates as a man-machine interface for the mobile device 130 so that the driver of the vehicle can safely use the car-queue service and search service while in the vehicle.

When the human interface device 800 is powered on, a Bluetooth device installed in the human interface device 800 starts and the plug-in application on the mobile device 130 associated with the web service provided by the server 110 is designed to start running on the mobile device 130. The human interface device 800 may be arranged to communicate with the mobile device 130 using WiFi, or wired communication technology, such as USB cables, in this embodiment.

The human interface device 800 has a power button 820 for turning on the human interface device 800, a souce button 830 for selecting a service provided by the server 110, tuning/scanning buttons 840 and 850 for tuning the station being provided by the server 110, preset buttons 870 for accessing favorite stations, audio play control buttons 880, 882 and 884 for controlling audio signals, such as play, stop, fast forward, rewind, and playback for a certain time period and skip audio for a certain time period, a bookmark button 892 for bookmarking some contents associated with the selected source, a talk button 894 for recording speech input or voice memos spoken by the user and an OK button 894 for playing back the speech input or voice memos for reviewing the contents thereof.

The bookmark button 892 is characterized to bookmark information of the sources provided by the server 110 and to obtain tag information associated with the bookmarked information when pushing the bookmark button 892 while the audio signals from the selected source is reproduced. The tag information of an embodiment of the present invention includes a text string including a URL (Uniform Resource Locator), an email address and/or telephone numbers, and addresses of the locations associated with the bookmarked information. The tag information may also include titles of music or songs if the content is music or songs.

The tag information which has been obtained by touching the bookmark button 892 is transferred to the memory in the mobile device 120 and stored therein. The memorized tag information is used later when the user needs to review the information of the source again.

Talk button 894 is used when the user wants to send voice messages to other parties via the communication network 140. When touching the talk button 894 for less than 0.3 seconds, for example, audio inputs from a microphone 265 are recorded in the memory in the mobile device 130 for a predetermined time period, for example, 10 seconds. Then, computer programs running on the mobile device 130 transmit the memorized audio data together with associated information such as location information of the user of the mobile device 130 and time information when it is transmitted. When the talk button 894 is pushed for a predetermined time period, for example, not less than 0.3 seconds and not more than 3 seconds, the audio inputs from the user via the microphone 865 is recorded in the memory so that the user can review the message before transmitting it (a memo function). In this instance, a current time when the talk button is pushed and current location information (latitude and longitude) is recorded together with the audio inputs into the memory of the mobile device 130. The talk button may be designed to have another function as follows. When touched, the programs running on the mobile computer 130 starts recording the audio inputs from the microphone 865 and stops recording the audio inputs when the talk button 894 is next touched.

The human interface device 800 has a speaker 860 for outputting the audio outputs of the mobile device 130 and an information display 810 for displaying the context of the selected source, which include source names, such as inbox, stations 1, 2 and 3, to be selected by the user, a new message receipt indicator, time information and a battery level indicator for the battery of the human interface device 800.

Figure 9:
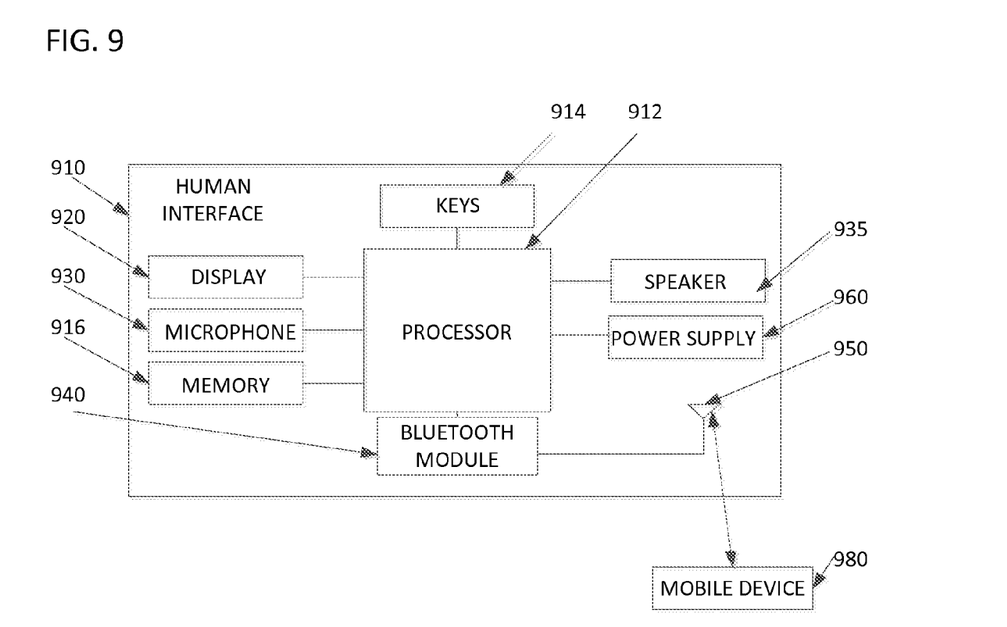
FIG. 9 illustrates a block diagram depicting the architecture for a human interface device and a mobile device used in the interactive audio communication system of an embodiment of the present invention.

FIG. 9 illustrates a block diagram depicting architecture for the human interface device shown in FIG. 8. The human interface device 910 is configured by a processor 912, a memory 916 on which control programs for controlling the input and output devices such as a display 920 for displaying the information related to the selected source, a microphone 930 for receiving speech input signals from the user, a speaker 935 for outputting audio signals, keys or operation buttons 914 for operating the interactive audio communications, a Bluetooth module 940 which controls communications between the human interface device 910 and a mobile device 980, and power supply 960 for the human interface device 910. In this embodiment, the Bluetooth module 940 is used to establish communications between the human interface device 910 and the mobile device 980. However, a Wi-Fi module or USB connection can be used as an alternative of the Bluetooth module 440.

INDUSTRIAL APPLICABILITY

Messages in an audio form is converted into text strings using STT and both data including the audio form and converted text strings are transmitted to the other party together with the time and location information. The text strings in an incoming email and SMS can be read out loud using TTS. By using these features of an embodiment of the invention, the driver of a vehicle can work on text-based emails and SMSs to read and reply without using the hands and eyes. As a result, the driver can more efficiently or enjoyably use driving time and time wasted in traffic.

What is claimed is:

1. A system for operating interactive audio communications using a communication network, comprising:
  at least one server for providing an application programming interface (API) for operating the interactive audio communications on the communication network, said at least one server being connected to the communication network;
  a first computing device for operating a first application program using the API via the communication network, the first computing device comprising:
  a first processor;
  a first memory;
  a first speaker; and
  a first display;
  a second computing device for operating a second application program using the API via the communication network, the second computing device comprising:
  a second processor;
  a second memory;
  a second microphone;
  a second speaker; and
  a second display for displaying information transmitted from the first computing device via the communication network using the second application program using the API via the communication network;
  wherein the second memory stores instructions in the second application program that, when executed by the second processor, causes the second processor to perform a second operation comprising the steps of:
  starting the second application program using the API via the communication network;
  downloading the information from the first computing device via the server;
  displaying the downloaded information on the second display;
  receiving audio inputs from a user of the second computing device via the second microphone;
  memorizing data of the audio inputs into the second memory;
  transforming the audio inputs to text strings; and
  transmitting the data of the audio inputs in the second memory and/or the text strings to the first computing device;
  wherein the first memory stores instructions in the first application program that, when executed by the first processor, causes the first processor to perform a first operation comprising the steps of:
  receiving the data of the audio inputs and/or the text strings;
  displaying the text strings together with an audio mark which shows that the data of the audio inputs are transmitted together with the text strings if the text strings are received together with the data of the audio inputs on the first display; and reproducing the audio inputs via the first speaker if a user of the first computing device touches the audio mark on the first display.

2. The system for operating interactive audio communications using the communication network of claim 1,
wherein the second operation of the second processor further comprises the steps of:
displaying a talk button on the second display; and
starting recording of the audio inputs from the user of the second computing device via the second microphone into the second memory for a predetermined time period when the talk button is touched.

3. The system for operating interactive audio communications using the communication network of claim 1,
wherein the second operation of the second processor further comprises the steps of:
displaying a talk button on the second display;
starting recording of the audio inputs from the user via the second microphone into the second memory when the talk button is touched; and
stopping the recording of the audio inputs from the user when the talk button is next touched.

4. The system for operating interactive audio communications using the communication network of claim 1,
wherein the second operation of the second processor further comprises the steps of:
displaying a talk button on the second display;
starting recording of the audio inputs from the user via the second microphone into the second memory together with geographical location information of the user of the second computing device and time information into the second memory when the talk button is touched for a predetermined time period.

5. The system for operating interactive audio communications using the communication network of claim 4,
wherein the predetermined time period is set to be not less than 0.3 seconds and not more than three seconds.

6. The system for operating interactive audio communications using the communication network of claim 1,
wherein the second operation of the second processor further comprises the steps of:
changing frequency characteristics of signals of the audio inputs from the user via the second microphone; and
memorizing the data of the audio inputs having changed frequency characteristics thereof into the second memory.

7. The system for operating interactive audio communications using the communication network of claim 1,
wherein the second operation of the second processor further comprises the steps of:
downloading pre-recorded audio from said at least one server;
selecting one of the pre-recorded audio by outputting the selected pre-recorded audio via the second speaker and selecting the pre-recorded audio;
memorizing the selected pre-recorded audio into the second memory when responding to a message sent via the communication network; and
transmitting the selected pre-recorded audio when responding to a message from a user of the first computing device via the communication network.

8. A system for operating interactive audio communications using a communications network, comprising:
at least one server for providing an application programming interface (API) for operating the interactive audio communications on the communication network, said at least one server being connected to the communication network;
a first computing device for operating web-site programs using the API, the first computing device being arranged to communicate with said at least one server via the communication network, the first computing device comprising:
a first processor;
a first memory; and
a first display;
a second computing device for operating application programs using the API via the communication network, the second computing device comprising:
a second processor;
a second memory;
a second display; and
a second microphone
wherein the second memory stores instructions in the application programs that, when executed by the second processor, causes the second processor to perform a second operation comprising the steps of:
receiving an inquiry in audio form via the second microphone or an inquiry in text form from a user of the second computing device;
transforming the inquiry in the audio form into text strings; and
transmitting data of the inquiry in the audio form and text strings or data of the inquiry in the text form, geographical information of the user and time information showing a location and a time where and when the transmission to the first computing device is performed;
wherein the first memory stores instructions in the web-site programs that, when executed by the first processor, causes the first processor to perform a first operation comprising the steps of:
receiving the data of the inquiry in the audio form and the text strings or the data of the inquiry in the text form, the geographical information and the time information from the second computing device via the communication network;
extracting at least a keyword from the text string and associating said at least a keyword with advertisements to be broadcast;
displaying an audio mark for reproducing the inquiry in the audio form together with the text strings with said at least a keyword on the first display if the inquiry in the audio form is received;
displaying a time table including the advertisements including said at least a keyword on the first display;
displaying a map associated with the geographical location of the user on the first display; and
transmitting answers or response in a text form to the inquiry.

9. The system for operating interactive audio communications using the communication network of claim 8,
wherein the second operation of the second processor further comprises:
downloading the answers provided by the first computing device;
transforming the answers in text form into audio form if the answer is received in the text form;
outputting the answers in the audio form via the second speaker; and
memorizing the inquiry in the audio form or the inquiry in the text form and the downloaded answers provided by the first computing device.

10. The system for operating interactive audio communications using the communication network of claim 9,
wherein the second operation of the second processor further comprises:
downloading a rating factor of an operator who is providing the answers or responses; and
memorizing the rating factor to the second memory.

11. The system for operating interactive audio communications using the communication network of claim 8,
wherein the first operation of the first processor further comprises:
displaying a remaining time for responding to the inquiry from the user of the second computing device on the first display in a first color until a predetermined time has elapsed, and displaying an elapsed time in a second color from a point when the remaining time becomes zero.

12. The system for operating interactive audio communications using the communication network of claim 11,
wherein the first operation of the first processor further comprises:
displaying a reject button to be used when the inquiry from the user of the second computing device is not within parameters or guidelines of acceptable inquiries; and
responding to the inquiry from the user of the second computing device using a template message.

13. The system for operating interactive audio communications using the communication network of claim 9,
wherein the first operation of the first processor further comprises:
storing the answer in a text form from the operator who provides the answer to the inquiry from the user of the second computing device;
displaying the answers in the text form on the first display, wherein a word being difficult to transform into an audio form is made visible on the first display; and
storing the word into said at least one server.

14. A system for operating interactive audio communications using a communication network, comprising:
at least one server for providing an application programming interface (API) for operating the interactive audio communications on the communication network, said at least one server being connected to the communication network;
a first computing device for operating a first application program using the API via the communication network, the first computing device comprising:
a first display;
a first processor; and
a first memory,
a second computing device for operating a second application program using the API via the communication network, the second computing device comprising:
a second processor,
a second memory;
a second microphone; and
a second speaker
wherein the first memory stores instructions in the first program that, when executed by the first processor, causes the first processor to perform a first operation comprising the steps of:
starting the first application program to display information provided by said at least one server;
selecting items from the information provided by said at least one server and/or creating to-do items;
transmitting the selected items and/or the to-do items to the second computing device via the communication network;
wherein the second memory stores instructions in the second program that, when executed by the second processor, causes the second processor to perform second operation comprising the steps of:
receiving the selected items and/or the to-do items transmitted from the first computing device via the communication network;
performing a function related to the selected items and/or the to-do items;
receiving audio inputs from a user of the second computing device via the second microphone;
transforming the audio inputs to text strings; and
transmitting data of the audio inputs and/or the text strings to the first computing device.

15. The system for operating interactive audio communications using the communication network of claim 14,
wherein the second computing device further comprises an interface device being designed to communicate with the second computing device via a wireless network, the interface device comprising:
a sub-microphone;
a sub-talk button for starting recording of the audio inputs from the user via the sub-microphone into the second memory for a first predetermined time period when the sub-talk button is pushed;
wherein the second operation of the second processor further comprises:
receiving the audio inputs from the user of the second computing device via the sub-microphone for the first predetermined time period when the sub-talk button is pushed.

16. The system for operating interactive audio communications using the communication network of claim 15,
wherein the sub-talk button has a function for memorizing the data of the audio inputs from the user via the sub-microphone into the second memory together with the geographical location information of the user of the second computing device and time information when the sub-talk button is pushed for a second predetermined time period.

17. The system for operating interactive audio communications using the communication network of claim 16, wherein the second predetermined time period is not less than 0.3 seconds and not more than 3.0 seconds.

18. The system for operating interactive audio communications using the communication network of claim 14,
wherein the second computing device further comprises an interface device being designed to communicate with the second computing device via a wireless network, the interface device comprising:
a sub-microphone;
a sub-talk button for starting recording of the audio inputs from the user via the sub-microphone into the second memory when the sub-talk button is pushed and for stopping recording of the audio inputs when the sub-talk button is next pushed.

19. The system for operating interactive audio communications using the communication network of claim 18,
wherein the interface device further comprises:
a bookmark button for bookmarking an item from the information provided by the first computing device, the tag information including a text string constituting a resource associated with the bookmarked item; and
a sub-speaker,
wherein the second operation of the second processor further comprises the steps of:

downloading the information provided by said the first computing device;
reading out loud the information via the sub-speaker;
determining whether the bookmark button is pushed while or after the item to be bookmarked from the information is read out loud via the sub-speaker; and
extracting the tag information from the bookmarked item and memorizing the tag information into said at least one server if the bookmark button bookmarks the item from the information while or after the information is being read out loud via the sub-speaker.

\* \* \* \* \*